United States Patent [19]
Fisher

[11] 3,935,787
[45] Feb. 3, 1976

[54] DOOR HANDLE ANCHOR

[75] Inventor: Julian Vernon Fisher, Carpentersville, Ill.

[73] Assignee: Illinois Tool Works Inc., Chicago, Ill.

[22] Filed: June 19, 1974

[21] Appl. No.: 480,724

[52] U.S. Cl............ 85/80; 16/110 R; 85/84; 151/41.76; 151/44
[51] Int. Cl.²........................................ A47B 95/02
[58] Field of Search........... 85/84, 80, 83; 151/43, 151/44, 41.75, 41.76; 16/110 R, 111, 121 R

[56] References Cited
UNITED STATES PATENTS

| | | | |
|---|---|---|---|
| 3,126,039 | 3/1964 | Fiddler | 85/80 |
| 3,139,768 | 7/1964 | Biesecker | 151/41.75 |
| 3,239,243 | 3/1966 | Grellsson | 85/80 |
| 3,319,918 | 5/1967 | Rapata | 85/82 |
| 3,377,633 | 4/1968 | Waldon | 151/44 |
| 3,495,643 | 2/1970 | Dey et al. | 151/41.76 |
| 3,508,593 | 4/1970 | Gill | 151/41.75 |
| 3,694,013 | 9/1972 | Heitner | 151/41.76 |

FOREIGN PATENTS OR APPLICATIONS

| | | | |
|---|---|---|---|
| 903,175 | 8/1962 | United Kingdom | 16/121 |
| 1,013,219 | 12/1965 | United Kingdom | 85/80 |
| 1,183,553 | 3/1970 | United Kingdom | 16/110 R |
| 1,231,588 | 12/1966 | Germany | 16/110 R |

Primary Examiner—Marion Parsons, Jr.
Attorney, Agent, or Firm—Olson, Trexler, Wolters, Bushnell & Fosse, Ltd.

[57] ABSTRACT

The embodiment of the invention disclosed herein is directed to a door handle anchor which can be placed behind the panel of a sheet metal door and has prongs formed thereon to extend through an aperture formed in the door. A threaded fastener is inserted between the prongs and threaded into a bore in alignment therewith. The prongs are urged outwardly to prevent pushing the anchor back through the aperture during threading of the fastener. The anchor is formed of a molded plastic component having an integral arm extending a distance sufficient to engage a sidewall formed by turned edge of the door receiving the same.

7 Claims, 7 Drawing Figures

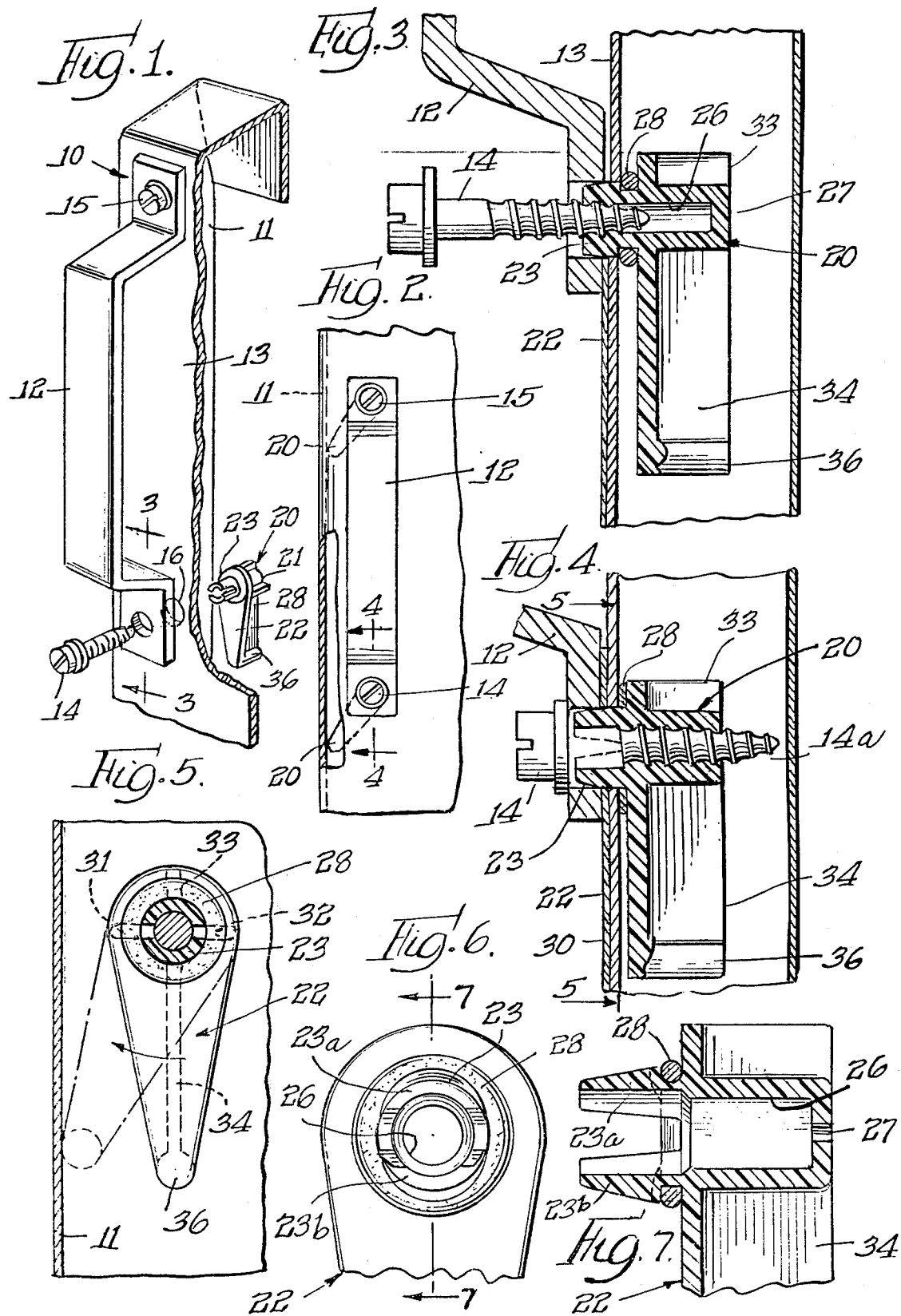

DOOR HANDLE ANCHOR

BACKGROUND OF THE INVENTION

This invention relates generally to an anchor for a threaded fastener, and more particularly to an anchor for a door handle of appliances such as a refrigerator or the like. More specifically, the invention is directed to a simple and efficient single molded plastic anchor element which has means to prevent relative rotation of the anchor while threading a fastener therein during mounting of handles and the like.

The door handle anchor of this invention provides substantial use for improvements over existing threaded anchor devices which are now commonly used in the field of household appliances to mount door handles and the like to sheet metal surfaces. However, it will be understood that while this invention is directed particularly to door handle anchors for use with home appliances, the specific device disclosed herein can be used in other allied fields such as the automotive industry, plastics industry, and the like.

Heretofore, door handle anchors used for mounting door handles to the sheet metal surface of a refrigerator door included a metal anchored tab which may be spot-welded or otherwise held in place during the threading of the associated screw or bolt. Many times prior art anchors require the use of tools to prevent rotation between the anchor and the threaded fastener while tightening the fastener thereto. This required the use of extra tools and was time-consuming. Furthermore, should removal of the fastener be accomplished after complete assembly of the refrigerator door the anchor may become completely dislodged from its location and rendered substantially useless as the threaded portion of the anchor will no longer be in alignment with the aperture to receive the threaded screw or bolt.

SUMMARY OF THE INVENTION

Accordingly, it is an object of this invention to provide a new and useful door handle anchor which can be held in registry with an aperture formed in the sheet metal of the door by prongs and wherein relative rotation of the anchor is prevented by an arm which engages a turned side-wall portion forming the door.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a fragmentary perspective view of a door structure to which a door handle is fastened utilizing the anchor structure of this invention;

FIG. 2 is a fragmentary front view of the door, door handle and illustrating a pair of anchors used in accordance with the principles of this invention;

FIG. 3 is a side elevational sectional view of the anchor device constructed in accordance with the principles of this invention;

FIG. 4 illustrates the threaded fastener in its fully registered position in the anchor of this invention;

FIG. 5 is a front view illustrating the arm portion engaging a turned edge of the sheet metal forming the door receiving the same;

FIG. 6 is an enlarged front view of the prong members initially receiving the threaded fastener; and FIG. 7 is an enlarged fragmentary sectional view illustrating the anchor device of this invention.

DETAILED DESCRIPTION OF THE ILLUSTRATED EMBODIMENT

Referring now to FIG. 1 there is seen a fragmentary portion of a door which is designated generally by reference numeral 10. The door 10 is here illustrated as a portion of a refrigerator door which has a turned edge 11 forming a sidewall in the usual well-known manner. A handle 12 is to be fastened to the front face 13 of the door by a pair of threaded fasteners 14 and 15 which pass through aligned apertures associated with the handle and door. The aperture 16 is here illustrated for the purpose of clarity.

In accordance with the present invention an anchor member 20 has a body portion 21 for an engagement with a flange 22 to be placed behind the front wall 13. A prong member 23 is inserted through the aperture 16 and the fastener 14 is inserted between the prongs during the initial fastening operation. There are a pair of such anchor members 20 illustrated in FIG. 2.

FIG. 3 illustrates the initial insertion of the threaded fastener 14 between the prong members 23. This initially urges the prongs outward so that they firmly engage the periphery of the aperture 16 and prevent rearward retraction of the anchor. The anchor has a bore 26 formed therein which is in registry with the space between the prongs 23. A reduced diameter aperture 27 insures that the fastener 14 is firmly held in place.

To provide a seal for the aperture 16 a resilient sealing ring 28 is placed about the prongs. Furthermore it will be understood that a decorative indicia-bearing nameplate 30 may be placed on the front wall 13 and held in place by the handle and threaded fastener 14 if desired.

The anchor member 20 is formed of a body portion having diametrically opposed rib sections 31 and 32 formed on the side thereof and a pair of diametrically opposed rib portions 33 and 34 formed transverse thereto. The rib portion 34 forms an extended arm which terminates in a enlarged diameter portion 36 to engage the turned edge 11 forming the sidewall for the door panel. The length of the rib and arm formed thereby is less than the distance of the aperture 16 displaced from the turned edge 11. Therefore, as best seen in FIG. 5, rotation of the threaded fastener 14 will cause the arm portion to engage with the wall 11 and eliminate further relative rotation as the threaded fastener is run home. This is best illustrated in FIG. 4 which shows the threaded fastener fully engaging the anchor. The rib portions 33 and 34 may serve as an excellent handle for use by an operator during installation.

FIGS. 6 and 7 illustrate the diverging outwardopposing wall portions of the prongs 23 as shown by 23a and 23b. This outward divergent characteristic of the prong is best illustrated in FIG. 7 and facilitates receiving the tapered end 14a on the fastener 14, as seen in FIG. 4.

What has been described is a simple and efficient anchor device which can be used to mount door handles to appliances such as refrigerators, and the like. While only a single specific embodiment of the present invention has been disclosed herein, it will be understood that variations and modifications may be effected without departing from the spirit and scope of the novel concepts as set forth in the following claims.

The invention is claimed as follows:

1. A door handle anchor for receiving a threaded fastener having predetermined pitch and major diameters to mount a handle thereto, comprising in combination; a body having a bore formed therein to receive a threaded fastener, said bore having a diameter equal to or less than said pitch diameter whereby rotative introduction of said fastener results in threads being formed in said body, a flange formed on said body transverse to the axis of said bore to overlie the periphery of an aperture formed in a door panel of relatively thin material, said aperture being located a predetermined distance from a turned edge of said door panel, prong means formed integrally with said body and extending therefrom parallel to the axis of said bore and adapted for insertion into said aperture partially to extend through said panel, said prong means being sufficiently spaced apart so as to define an opening therebetween to freely receive the major diameter of the threaded end of said threaded fastener when in its initial condition and having a diameter an interconnecting section between said opening and said bore greater than said bore diameter, and an elongated arm portion formed integrally with said body and extending from said opening a distance greater than said predetermined distance, whereby said anchor will have the elongated arm portion thereof engaging said turned edge during tightening of said threaded fastener for holding the same in place while mounting the handle to the door panel.

2. The door handle anchor for receiving a threaded fastener to mount a door handle as set forth in claim 1 wherein a recess is formed about the periphery of said prong means to form a retaining edge for the periphery of said aperture to hold said anchor rotatably in place.

3. The door handle anchor for receiving a threaded fastener to mount a handle as set forth in claim 2 further including a resilient sealing ring positioned about said prong means engaging said recess.

4. The door handle anchor for receiving a threaded fastener to mount a door handle as set forth in claim 1 wherein said body is formed of rigid rib sections extending from said flange in quadrature, said arm portion being an extended one of said ribs.

5. The door handle anchor for receiving a threaded fastener to mount a door handle as set forth in claim 4 wherein the terminating end of said rib portion forming said arm portion is circular configuration.

6. The door handle anchor for receiving a threaded fastener to mount a door handle as set forth in claim 1 wherein said prong means is formed of spaced-apart portions having a split formed therein with the diverging outward walls leading from said opening, said diverging outward walls having the ends thereof spaced apart sufficient to freely receive the major diameter of the terminating end of the threaded fastener.

7. A door handle anchor of the type as set forth in claim 1, wherein said body includes means at the end of said bore opposite said prongs and defining an aperture substantially smaller in size than the diameter of said bore to accept the tapered end of said fastener, when inserted therethrough, in intimate sealing relation and thereby providing a prevailing torque on said fastener.

* * * * *

UNITED STATES PATENT OFFICE
CERTIFICATE OF CORRECTION

Patent No. 3,935,787                Dated February 3, 1976

Inventor(s) Julian Vernon Fisher

It is certified that error appears in the above-identified patent and that said Letters Patent are hereby corrected as shown below:

Claim 1, line 15, after "diameter" insert -- an interconnecting section between said opening and said bore --.

Signed and Sealed this

Third Day of May 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. __3,935,787__  Dated __February 3, 1976__

Inventor(s) __Julian Vernon Fisher__  Page 1 of 2

It is certified that error appears in the above-identified patent and that said Letters Patent are hereby corrected as shown below:

Claim 1 should read as follows:

1. A door handle anchor for receiving a threaded fastener having predetermined pitch and major diameters to mount a handle thereto, comprising in combination; a body having a bore formed therein to receive a threaded fastener, said bore having a diameter equal to or less than said pitch diameter whereby rotative introduction of said fastener results in threads being formed in said body, a flange formed on said body transverse to the axis of said bore to overlie the periphery of an aperture formed in a door panel of relatively thin material, said aperture being located a predetermined distance from a turned edge of said door panel, prong means formed integrally with said body and extending therefrom parallel to the axis of said bore and adapted for insertion into said aperture partially to extend through said panel, said prong means being sufficiently spaced apart so as to

UNITED STATES PATENT OFFICE
CERTIFICATE OF CORRECTION

Patent No. 3,935,787     Dated February 3, 1976

Inventor(s)    Julian Vernon Fisher      Page 2 of 2

It is certified that error appears in the above-identified patent and that said Letters Patent are hereby corrected as shown below:

define an opening therebetween to freely receive the major diameter of the threaded end of said threaded fastener when in its initial condition and having a diameter greater than said bore diameter, an interconnecting section between said opening and said bore, and an elongated arm portion formed integrally with said body and extending from said opening a distance greater than said predetermined distance, whereby said anchor will have the elongated arm portion thereof engaging said turned edge during tightening of said threaded fastener for holding the same in place while mounting the handle to the door panel.

This certificate supersedes Certificate of Correction issued May 3, 1977.

Signed and Sealed this

Fifteenth Day of November 1977

[SEAL]

Attest:

RUTH C. MASON      LUTRELLE F. PARKER
*Attesting Officer*      *Acting Commissioner of Patents and Trademarks*

UNITED STATES PATENT OFFICE
CERTIFICATE OF CORRECTION

Patent No.     3,935,787          Dated February 3, 1976

Inventor(s)        Julian Vernon Fisher      Page 1 of 2

It is certified that error appears in the above-identified patent and that said Letters Patent are hereby corrected as shown below:

Claim 1 should read as follows:

1. A door handle anchor for receiving a threaded fastener having predetermined pitch and major diameters to mount a handle thereto, comprising in combination; a body having a bore formed therein to receive a threaded fastener, said bore having a diameter equal to or less than said pitch diameter whereby rotative introduction of said fastener results in threads being formed in said body, a flange formed on said body transverse to the axis of said bore to overlie the periphery of an aperture formed in a door panel of relatively thin material, said aperture being located a predetermined distance from a turned edge of said door panel, prong means formed integrally with said body and extending therefrom parallel to the axis of said bore and adapted for insertion into said aperture partially to extend through said panel, said prong means being sufficiently spaced apart so as to

UNITED STATES PATENT OFFICE
CERTIFICATE OF CORRECTION

Patent No. 3,935,787          Dated February 3, 1976

Inventor(s)     Julian Vernon Fisher      Page 2 of 2

It is certified that error appears in the above-identified patent and that said Letters Patent are hereby corrected as shown below:

define an opening therebetween to freely receive the major diameter of the threaded end of said threaded fastener when in its initial condition and having a diameter greater than said bore diameter, an interconnecting section between said opening and said bore, and an elongated arm portion formed integrally with said body and extending from said bore a distance greater than said predetermined distance, whereby said anchor will have the elongated arm portion thereof engaging said turned edge during tightening of said threaded fastener for holding the same in place while mounting the handle to the door panel.

This certificate supersedes Certificate of Correction issued November 15, 1977.

Signed and Sealed this

Thirteenth Day of June 1978

[SEAL]

Attest:

RUTH C. MASON
*Attesting Officer*

DONALD W. BANNER
*Commissioner of Patents and Trademarks*